(No Model.)

T. H. CARLIN.

VALVE GEARING FOR STEAM ENGINES.

No. 316,739. Patented Apr. 28, 1885.

Witnesses
Geo. W. Rea
W. E. Shaffer

Thomas H. Carlin
Inventor by Connolly Bros & McTighe

UNITED STATES PATENT OFFICE.

THOMAS H. CARLIN, OF ALLEGHENY, PENNSYLVANIA.

VALVE-GEARING FOR STEAM-ENGINES.

SPECIFICATION forming part of Letters Patent No. 316,739, dated April 28, 1885.

Application filed December 15, 1884. (No model.)

*To all whom it may concern:*

Be it known that I, THOMAS H. CARLIN, of Allegheny, in the county of Allegheny and State of Pennsylvania, have invented certain new and useful Improvements in Valve-Gearing for Steam-Engines; and I do hereby declare that the following is a full, clear, and exact description of the invention, which will enable others skilled in the art to which it appertains to make and use the same, reference being had to the accompanying drawings, which form a part of this specification.

This invention has relation to valve-regulators for slide-valve steam-engines, and has for its object to provide a slide-block for use in connection with a valve-rod for a slide-valve engine, whereby unnecessary wear and friction of the slide-block may be obviated. It also includes a means by which the regulation of the slide-block and its adjustment while stopping or starting the engine will be more easily accomplished.

In the slide-blocks now generally used on this class of engines the slide-block and the valve connected therewith receive their movement through a hook and arm connected to and moved by an eccentric on the main shaft of the engine, and the adjustment of the slide-block and valve is regulated by a lever having one of its arms in gear with a ratchet on the bottom of slide-box. The arm of this lever is permanently geared with the slide-block, and as a consequence this lever is continually in action and moving during the entire time that the engine is working. When it is desirable to stop the engine, the hook on the eccentric-rod is thrown off from its connection with the slide-block, and the movement of the valves is regulated by means of the lever-arm. It will be readily understood that the continual movement of the slide-block and the lever geared thereto causes the gear-teeth on the rack and the short arm of the lever, as also the bearing of the lever, to become worn to such an extent as to require frequent repairs or renewal of the parts thus worn.

The object of my invention is to provide a means whereby the lever and its connected arm will be geared with the rack on the slide-box during such time only as is necessary to use the lever in regulating the movement of the valve.

Figure 1:
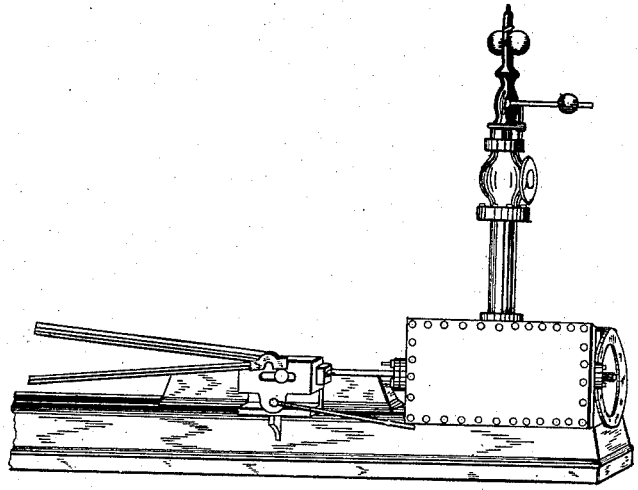
Figure 2:
Figure 3:
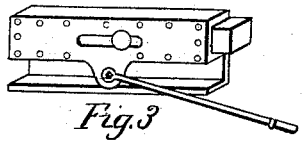
Figure 4:
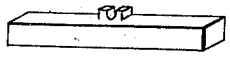
Figure 5:
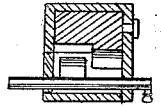

Referring to the accompanying drawings, Figure 1 represents a portion of an engine with my improved slide-block attached thereto. Fig. 2 shows the slide-block and its frame detached from the engine, and having the front plate of the frame removed in order to show the position of the rack and short arm of the lever. Fig. 3 shows the same view, with the front plate and long arm of the lever in position thereon. Fig. 4 is a perspective view of the slide-block, illustrating the construction of the gear-rack. Fig. 5 is a transverse sectional view of the slide-block and frame.

In constructing a slide-block and lever according to my invention I make the slide-block of the usual and well-known shape and material; but instead of making the rack-teeth the entire width of the block and extending across the bottom thereof, I form them narrower than the bottom of the block, making them generally about [one-half the width of the block—that is to say, that instead of extending entirely across the bottom of the slide-block they extend from one side to, or about to, the center of the bottom of the slide-block—the object of this construction being that when it is desirable to connect the lever to the slide-block it can be readily done by sliding the lever on its bearings until the short arm thereof is geared with the rack on the bottom of the slide-block, and when it is desirable to disconnect the lever from the slide-block a movement in the opposite direction accomplishes the desired object, as the short arm of the lever is then in position under the slide-block where the teeth on the rack do not take hold and cause it to move.

It will be seen that the lever and its short arm connected therewith are at rest while the engine is moving, thus preventing unnecessary wear of the rack and end of the lever.

Having described my invention, I claim—

1. In a valve-gearing for steam-engines, the combination of a slide-block having gear-teeth formed on or attached thereto, and extending over only a portion of the width of said block, with an adjustable lever for regulating the movement of said block, substantially as described.

2. In a valve-gearing for steam-engines, the combination of a slide-block and a lever, said block and lever being so constructed as to be geared with or detached from each other while the engine is in motion, substantially as described.

3. In a valve-gearing for steam-engines, the combination of a slide-block with a lever for moving said block, and means, substantially as described and shown, whereby said lever may be moved into or out of gear with the block.

In testimony that I claim the foregoing as my own I have hereto affixed my signature in presence of two witnesses.

THOMAS H. CARLIN.

Witnesses:
J. G. BACKOFEN,
ALVA A. MOORE.